US012583605B2

(12) United States Patent
Ilak et al.

(10) Patent No.: US 12,583,605 B2
(45) Date of Patent: Mar. 24, 2026

(54) FAST THRUST RESPONSE USING OPTIMAL POWER SPLITTING IN HYBRID ELECTRIC AIRCRAFT

(71) Applicant: RTX Corporation, Farmington, CT (US)

(72) Inventors: Milos Ilak, Hoboken, NJ (US); Michael Winter, New Haven, CT (US); Yasir Al-Nadawi, South Windsor, CT (US)

(73) Assignee: RTX Corporation, Farmington, CT (US)

( * ) Notice: Subject to any disclaimer, the term of this patent is extended or adjusted under 35 U.S.C. 154(b) by 67 days.

(21) Appl. No.: 18/614,376

(22) Filed: Mar. 22, 2024

(65) Prior Publication Data

US 2025/0296689 A1 Sep. 25, 2025

(51) Int. Cl.
| | |
|---|---|
| *B64D 31/06* | (2024.01) |
| *B64D 31/18* | (2024.01) |
| *F02C 9/28* | (2006.01) |
| *H02P 5/74* | (2006.01) |
| *H02P 23/00* | (2016.01) |

(52) U.S. Cl.
CPC ............. *B64D 31/06* (2013.01); *B64D 31/18* (2024.01); *F02C 9/28* (2013.01); *H02P 5/74* (2013.01); *H02P 23/0018* (2013.01); *F05D 2270/709* (2013.01)

(58) Field of Classification Search
CPC ........... B64D 31/06; B64D 31/18; F02C 9/28; H02P 5/74; H02P 23/0018; F05D 2270/709
See application file for complete search history.

(56) References Cited

U.S. PATENT DOCUMENTS

| | | | | | |
|---|---|---|---|---|---|
| 3,921,390 | A | * | 11/1975 | Stoltman | .................... F02C 7/10 60/39.23 |
| 4,178,754 | A | * | 12/1979 | Earnest | .................... F01K 23/10 60/773 |
| 4,442,668 | A | * | 4/1984 | Conn | ......................... F02C 9/28 60/39.281 |

(Continued)

FOREIGN PATENT DOCUMENTS

| | | |
|---|---|---|
| CN | 112081663 A | 12/2020 |
| CN | 112922731 A | 6/2021 |

(Continued)

OTHER PUBLICATIONS

European Search Report dated Jul. 30, 2025, in connection with European Patent Application No. 25165761.5 , 9 pages.

*Primary Examiner* — Mussa A Shaawat

(57) ABSTRACT

A system including a engine having a low spool and a high spool, a first hybrid electric motor connected to the low spool and a second hybrid electric motor connected to the high spool. An auto-throttle controls an amount of power provided to the engine responsive to at least one aircraft parameter. A power splitting algorithm implemented between the auto-throttle and at least one of the first and second hybrid electric motors determines a power split dividing the total engine power into the power produced by burning fuel and electrical power provided to the at least one of the first and second hybrid electric motors responsive to control signals from the auto-throttle.

20 Claims, 9 Drawing Sheets

(56) References Cited

U.S. PATENT DOCUMENTS

| | | | | |
|---|---|---|---|---|
| 10,377,500 | B2 * | 8/2019 | Kobayashi | B64D 31/18 |
| 10,436,122 | B2 * | 10/2019 | Cline | F02C 7/32 |
| 10,717,539 | B2 * | 7/2020 | Menheere | F02C 3/145 |
| 11,867,131 | B2 * | 1/2024 | Evans | F02C 9/42 |
| 12,006,866 | B2 * | 6/2024 | Terwilliger | B64D 27/10 |
| 12,060,834 | B2 * | 8/2024 | Gilson | B64D 27/33 |
| 12,180,846 | B2 * | 12/2024 | Terwilliger | F01D 11/24 |
| 12,258,141 | B2 * | 3/2025 | Amari | B64D 27/33 |
| 12,291,995 | B2 * | 5/2025 | Amari | F02C 6/00 |
| 2010/0108806 | A1 * | 5/2010 | Chan | F02C 6/18 |
| | | | | 244/1 N |
| 2011/0178648 | A1 * | 7/2011 | Calvignac | F02C 7/32 |
| | | | | 700/291 |
| 2017/0074211 | A1 * | 3/2017 | Smith | F02K 1/09 |
| 2017/0187311 | A1 * | 6/2017 | French | B81C 1/00158 |
| 2017/0335713 | A1 * | 11/2017 | Klemen | F02C 7/36 |
| 2018/0354631 | A1 * | 12/2018 | Adibhatla | B64D 27/35 |
| 2019/0263519 | A1 * | 8/2019 | Argus | B64D 31/06 |
| 2020/0025149 | A1 * | 1/2020 | Hrach | F01D 11/14 |
| 2020/0031480 | A1 * | 1/2020 | Baig | B60L 58/20 |
| 2020/0346769 | A1 | 11/2020 | Knapp et al. | |
| 2020/0392903 | A1 * | 12/2020 | Turner | F02C 9/54 |
| 2020/0392910 | A1 * | 12/2020 | Whatley | F02C 9/48 |
| 2021/0172384 | A1 * | 6/2021 | Brown | F02C 6/20 |
| 2021/0222629 | A1 * | 7/2021 | Terwilliger | B64D 27/31 |
| 2021/0354840 | A1 * | 11/2021 | Mark | F02C 9/28 |
| 2022/0042465 | A1 | 2/2022 | Swann | |
| 2022/0055763 | A1 | 2/2022 | Terwilliger et al. | |
| 2022/0372922 | A1 * | 11/2022 | Eddy | F02D 11/04 |
| 2022/0402621 | A1 * | 12/2022 | McLean | B64D 27/355 |
| 2023/0021800 | A1 | 1/2023 | Britchford | |
| 2023/0053674 | A1 * | 2/2023 | Al-Nadawi | G08G 1/0145 |
| 2023/0136062 | A1 * | 5/2023 | Amari | B64D 31/06 |
| | | | | 701/4 |
| 2023/0137815 | A1 * | 5/2023 | Evans | F02C 7/262 |
| | | | | 60/39.281 |
| 2023/0139190 | A1 * | 5/2023 | Amari | B60L 50/16 |
| | | | | 244/62 |
| 2023/0184179 | A1 | 6/2023 | Swann et al. | |
| 2024/0084740 | A1 * | 3/2024 | Mathews, Jr. | F02C 9/56 |
| 2025/0223048 | A1 * | 7/2025 | Lepretre | B64D 27/33 |
| 2025/0270953 | A1 * | 8/2025 | Niergarth | F02C 7/185 |

FOREIGN PATENT DOCUMENTS

| | | |
|---|---|---|
| EP | 4173959 A1 | 5/2023 |
| WO | 2023175271 A1 | 9/2023 |
| WO | 2024018988 A1 | 1/2024 |

* cited by examiner

534

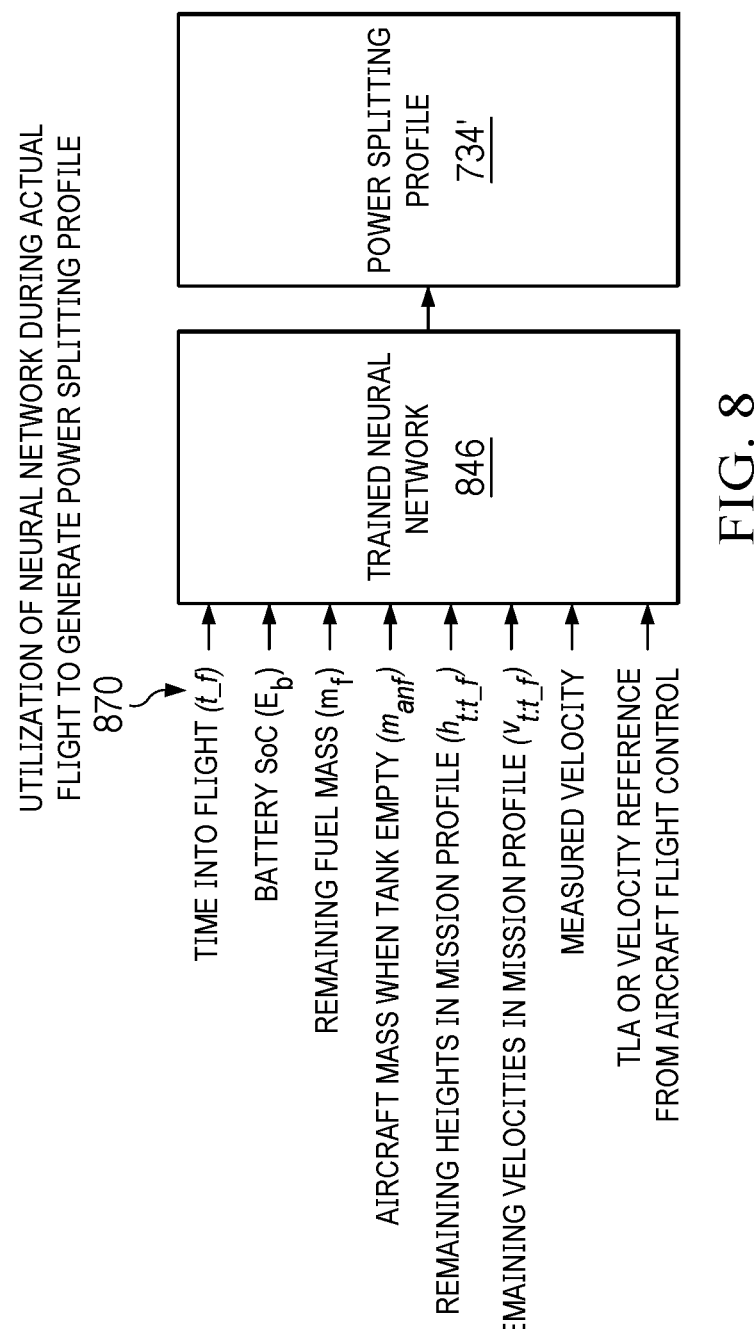

UTILIZATION OF NEURAL NETWORK DURING ACTUAL
FLIGHT TO GENERATE POWER SPLITTING PROFILE
870

TIME INTO FLIGHT ($t\_f$)

BATTERY SoC ($E_b$)

REMAINING FUEL MASS ($m_f$)

AIRCRAFT MASS WHEN TANK EMPTY ($m_{anf}$)

REMAINING HEIGHTS IN MISSION PROFILE ($h_{t.t\_f}$)

REMAINING VELOCITIES IN MISSION PROFILE ($v_{t.t\_f}$)

MEASURED VELOCITY

TLA OR VELOCITY REFERENCE
FROM AIRCRAFT FLIGHT CONTROL

TRAINED NEURAL
NETWORK
846

POWER SPLITTING
PROFILE
734'

FIG. 8

902 — CONNECT FIRST MOTOR

904 — CONNECT SECOND MOTOR

906 — CONTROL POWER

908 — IMPLEMENT ALGORITHM

910 — DETERMINE POWER SPLIT

912 — CONTROL OUTPUT

914 — THRUST RESPONSE

FAST THRUST RESPONSE USING OPTIMAL POWER SPLITTING IN HYBRID ELECTRIC AIRCRAFT

TECHNICAL FIELD

This disclosure relates generally to auto-throttle control. More specifically, this disclosure relates to using power splitting to hybrid electric engines to provide auto-throttle control.

BACKGROUND

Commercial aircraft often fly on auto-throttle control to maintain a constant flight speed and altitude. The fuel throttle command to the engine generated by the auto-throttle can be aggressive. This causes fast low-amplitude transients in the engine which can impact performance, for example through disabling turbine active clearance control. Additionally, the engine response may not be fast enough due to the turbomachinery and fuel system dynamics. This results in a slower response to wind gust and turbulence by the auto-throttle control, which can impact ride quality and passenger comfort.

SUMMARY

This disclosure relates to controlling operation of a turbine engine responsive to control outputs of the auto-throttle.

One aspect thereof comprises a system including an engine having a low spool and a high spool, a first hybrid electric motor connected to the low spool and a second hybrid electric motor connected to the high spool. An auto-throttle controls an amount of power provided to the engine responsive to at least one aircraft parameter. A power splitting algorithm implemented between the auto-throttle and at least one of the first and second hybrid electric motors determines a power split dividing the total engine power into the power produced by burning fuel and electrical power provided to the at least one of the first and second hybrid electric motors responsive to control signals from the auto-throttle.

The above-described aspect of the system may further comprise a neural network for implementing the power splitting algorithm, wherein the power split is determined using the neural network responsive to a throttle thrust level angle and a measured velocity of an aircraft.

The above-described aspect of the system may further comprise an aircraft autopilot velocity controller having an integrated auto-throttle for determining the throttle thrust level angle responsive to the measured velocity of the aircraft and a predetermined desired velocity.

The above-described aspect of the system wherein the power splitting algorithm provides improved changes in thrust response required by the auto-throttle while maintaining a substantially constant fuel flow to the engine.

The above-described aspect of the system may further comprise a neural network for implementing the power splitting algorithm, wherein the power split is determined responsive to a velocity reference from aircraft flight controller and a measured velocity of an aircraft.

The above-described aspect of the system wherein the power splitting algorithm provides rapid thrust changes to produce smooth airplane velocity while maintaining a substantially constant fuel flow to the engine.

The above-described aspect of the system wherein the at least one of the first and the second hybrid electric motors provide a fast low amplitude transient thrust response from the automatic engine controller.

The above-described aspect of the system wherein the power splitting algorithm provides an optimal split between fuel flow to the engine and power to the at least one of the first and the second electric motors.

In another aspect thereof the system has an engine having a low spool and a high spool. A first hybrid electric motor is connected to the low spool and a second hybrid electric motor connected to the high spool. An automatic engine controller determines the amount of power provided to the engine responsive to at least one aircraft parameter. A power splitting algorithm implemented in the automatic engine controller determines a power split dividing fuel provided to the engine and power provided to the at least one of the first and second hybrid electric motors responsive to control signals from the automatic engine controller. The power splitting algorithm provides an optimal split between fuel flow to the engine and power to the at least one of the first and the second electric motors. The at least one of the first and the second hybrid electric motors provide a fast low amplitude transient thrust response to the automatic engine controller.

The above-described aspect of the system may further comprise a neural network for implementing the power splitting algorithm, wherein the power split is determined using the neural network responsive to a throttle thrust level angle and a measured velocity of an aircraft.

The above-described aspect of the system may further comprise an aircraft autopilot velocity controller having an integrated auto-throttle for determining the throttle thrust level angle responsive to the measured velocity of the aircraft and a predetermined desired velocity.

The above-described aspect of the system wherein the power splitting algorithm provides improved changes in thrust response required by the auto-throttle while maintaining a substantially constant fuel flow to the engine.

The above-described aspect of the system may further comprise a neural network for implementing the power splitting algorithm, wherein the power split is determined responsive to responsive to a velocity reference from aircraft flight controller and a measured velocity of an aircraft.

The above-described aspect of the system wherein the power splitting algorithm provides rapid thrust changes to produce smooth airplane velocity while maintaining a substantially constant fuel flow to the engine.

In a further aspect thereof a method involves connecting a first hybrid electric motor to a low spool of a engine, connecting a second hybrid electric motor to a high spool of the engine, controlling an amount of power demanded from the engine using an automatic engine controller, implementing a power splitting algorithm in the automatic engine controller to control at least one of the first and second hybrid electric motors, determining, using the power splitting algorithm, a power split dividing fuel provided to the engine and power provided to the at least one of the first and second hybrid electric motors responsive to control signals from the automatic engine controller to provide an optimal split between fuel flow to the engine and power to the at least one of the first and the second electric motors, outputting a control output responsive to the determined power split, and providing a fast low amplitude transient thrust response from the automatic engine controller to the at least one of the first and the second hybrid electric motors.

The above-described aspect of the method may further comprise a neural network for implementing the power splitting algorithm. The neural network determining the power split using the neural network responsive to a throttle thrust level angle and a measured velocity of an aircraft.

The above-described aspect of the method may further comprise determining the throttle thrust level angle responsive to the measured velocity of the aircraft and a predetermined desired velocity using an aircraft autopilot velocity controller having an integrated auto throttle.

The above-described aspect of the method may further comprise implementing the power splitting algorithm using a neural network and determining the power split responsive to a velocity reference from aircraft flight controller and a measured velocity of an aircraft.

The above-described aspect of the method wherein the step of determining further comprises improving changes in thrust response required by the auto-throttle and maintaining a substantially constant fuel flow to the engine.

The above-described aspect of the method wherein the step of implementing the power splitting algorithm further implements the power splitting algorithm using at least one of model predictive control and AI based methods.

Other technical features may be readily apparent to one skilled in the art from the following figures, descriptions, and claims.

BRIEF DESCRIPTION OF THE DRAWINGS

For a more complete understanding of this disclosure and its advantages, reference is now made to the following description taken in conjunction with the accompanying drawings, in which like reference numerals represent like parts:

FIG. 8 is a schematic view of how the computing device of FIG. 7 may use a trained neural network to generate power splitting profiles for a mission profile.

DETAILED DESCRIPTION

FIGS. 1 through 9, described below, and the various embodiments used to describe the principles of the present disclosure are by way of illustration only and should not be construed in any way to limit the scope of this disclosure. Those skilled in the art will understand that the principles of the present disclosure may be implemented in any type of suitably arranged device or system.

Figure 1:
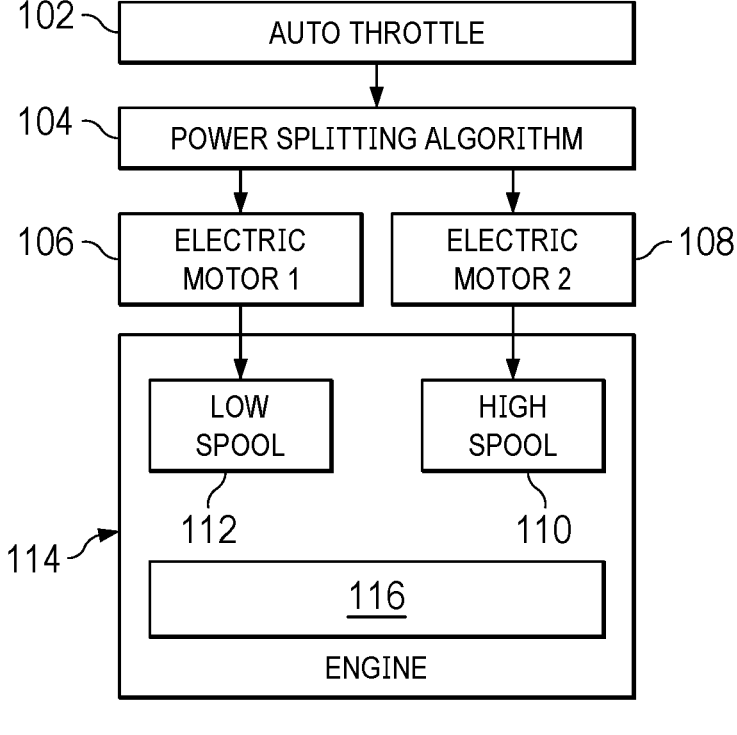
FIG. 1 illustrates a block diagram of an auto-throttle control system.

FIG. 1 is a functional block diagram of the auto-throttle control system of the present disclosure. The auto-throttle 102 provides control signals to an aircraft engine 114. The auto-throttle 102 provides control inputs to a power splitting algorithm 104 that determines control signals to first and second hybrid electric motors 106 and 108. While the illustration of FIG. 1 illustrates a pair of hybrid electric motors 106 and 108 only a single hybrid electric motor may be utilized in other embodiments. The output of hybrid electric motor 106 is connected to the low spool 112 of the engine 114 while the hybrid electric motor 108 is connected to the high spool 110 of the engine 114.

In a parallel hybrid architecture, the electric motors 106, 108 are added to one or both spools 110, 112 of the engine 114. Thus, both fuel flow to the combustor 116 and power to the electric motors 106, 108 can be used to track a thrust reference. The faster response of the electric motors 106, 108 and the resulting faster changes in thrust are leveraged to address the fast changes in thrust required by the auto-throttle 102 while keeping the fuel flow constant or changing slowly. An optimal power splitting algorithm 104 ensures both the minimization of fuel burn and fast thrust response by commanding one or more of the electric motors 106, 108 to respond to higher frequency changes in the thrust command from the auto-throttle 102. The power splitting algorithm 104 can be implemented via a model predictive controller, AI-based methods, or a combination of both.

Use of electric motors 106, 108 for fast transient thrust response from the auto-throttle 102 provides improved engine 114 performance. An optimal split between fuel flow to the combustor 116 of the engine 114 and power to the low spool motor 106 will provide fuel burn savings that are significant compared to using the gas turbine engine only or ad hoc split between fuel flow and power to the motor that has not been optimized. This is because the high spool 110 will operate with a more constant speed with tighter compressor and turbine clearances and less fuel flow variation. Additionally, turbine life is improved for the engine 114 due to reduced risk of rubs due to high-speed variation. Smoother flight is also provided as the auto-throttle control loop bandwidth is improved.

Figure 2:
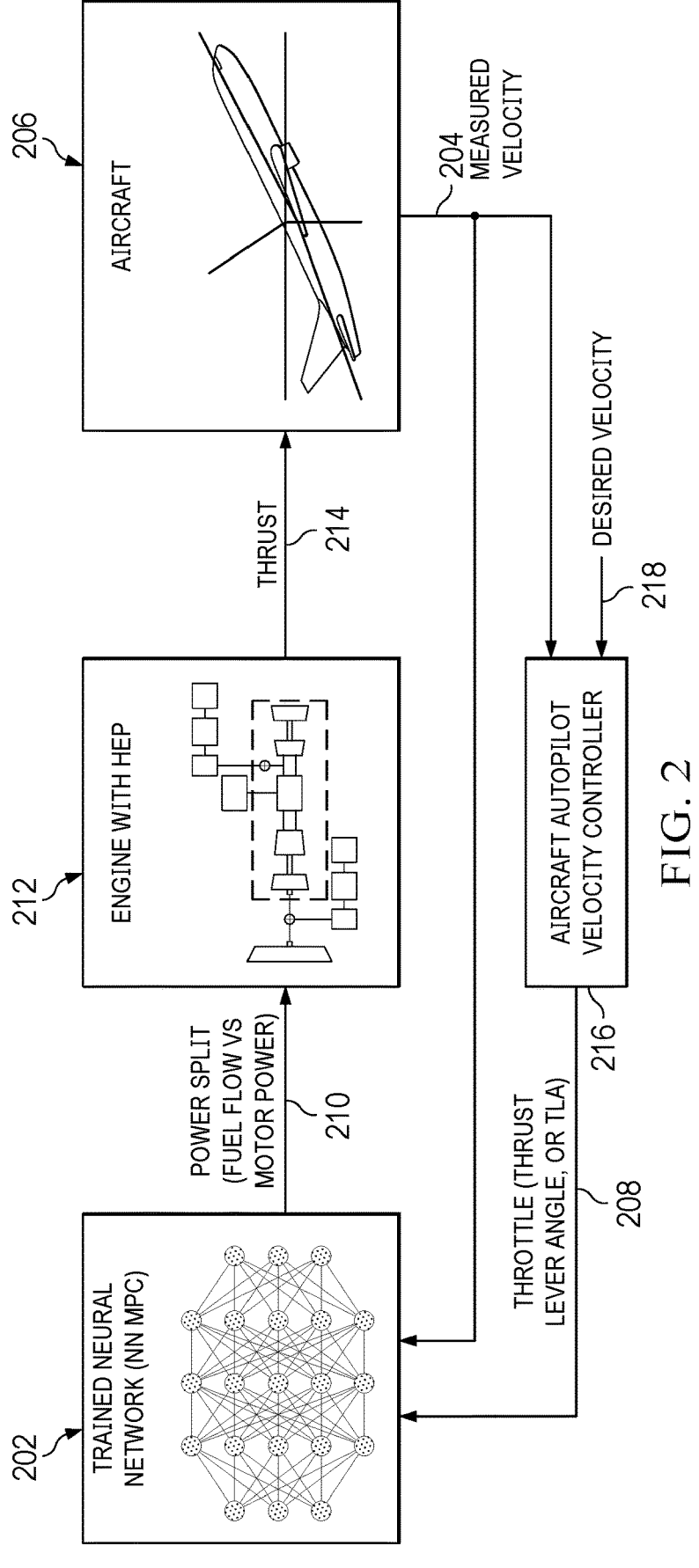
FIG. 2 illustrates a first embodiment of a power splitting algorithm of the auto-throttle control system.

Referring now to FIG. 2, there is illustrated a first embodiment of the power splitting algorithm 104. In this embodiment, a trained neural network 202 receives a measured velocity 204 from the aircraft 206 and a throttle thrust level angle (TLA) 208. The trained neural network 202 utilizes this information to generate a power split 210 for application to the engine 212 having a hybrid electric motor. Responsive to the power split 210 received by the engine 212, thrust 214 is generated for the aircraft 206 providing a new measured velocity 204. The throttle TLA 208 is generated by the aircraft autopilot velocity controller 216. The autopilot velocity controller 216 generates the throttle level responsive to the measured velocity 204 and a desired velocity 218 that has been established. The aircraft velocity controller 216 establishes the throttle TLA 208, but measured velocity is also provided directly to the neural network MPC 202. The neural network MPC 202 needs the high-frequency oscillation component of velocity so that it can react with the motor power fast response in order to determine the power split 210.

Figure 3:
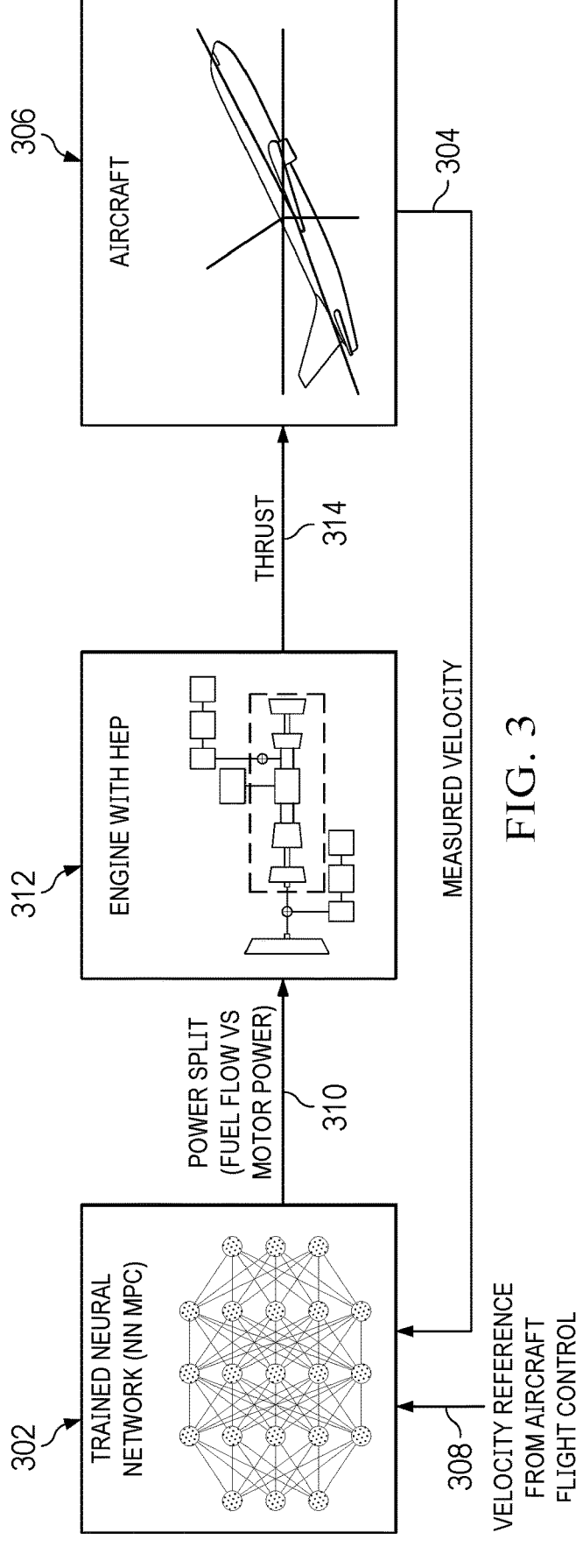
FIG. 3 illustrates a second embodiment of a power splitting algorithm of the auto-throttle control system.

Referring now to FIG. 3, there is illustrated an alternative embodiment of the power splitting algorithm wherein the trained neural network (NM MPC) 302 receives the measured velocity 304 from the aircraft 306 and also receives a velocity reference 308. The neural network 302 generates the power split 310 that is provided to the engine 312 having hybrid electric motors. The power split 310 comprises the split between the power produced by burning fuel and electrical power provided to the hybrid electric motors, with the sum of the two components of the power delivering the total engine thrust. The engine 312 responsive to the power split 310 provides thrust 314 enabling determination of the measured velocity 304 of the aircraft 306. The neural network 302 takes over the autopilot function for the velocity loop, compared to the embodiment in FIG. 2. The neural network 302 determines the power split 310 directly from the measured velocity (and other parameters) to track the velocity reference that is provided by the aircraft 306.

Figure 4:
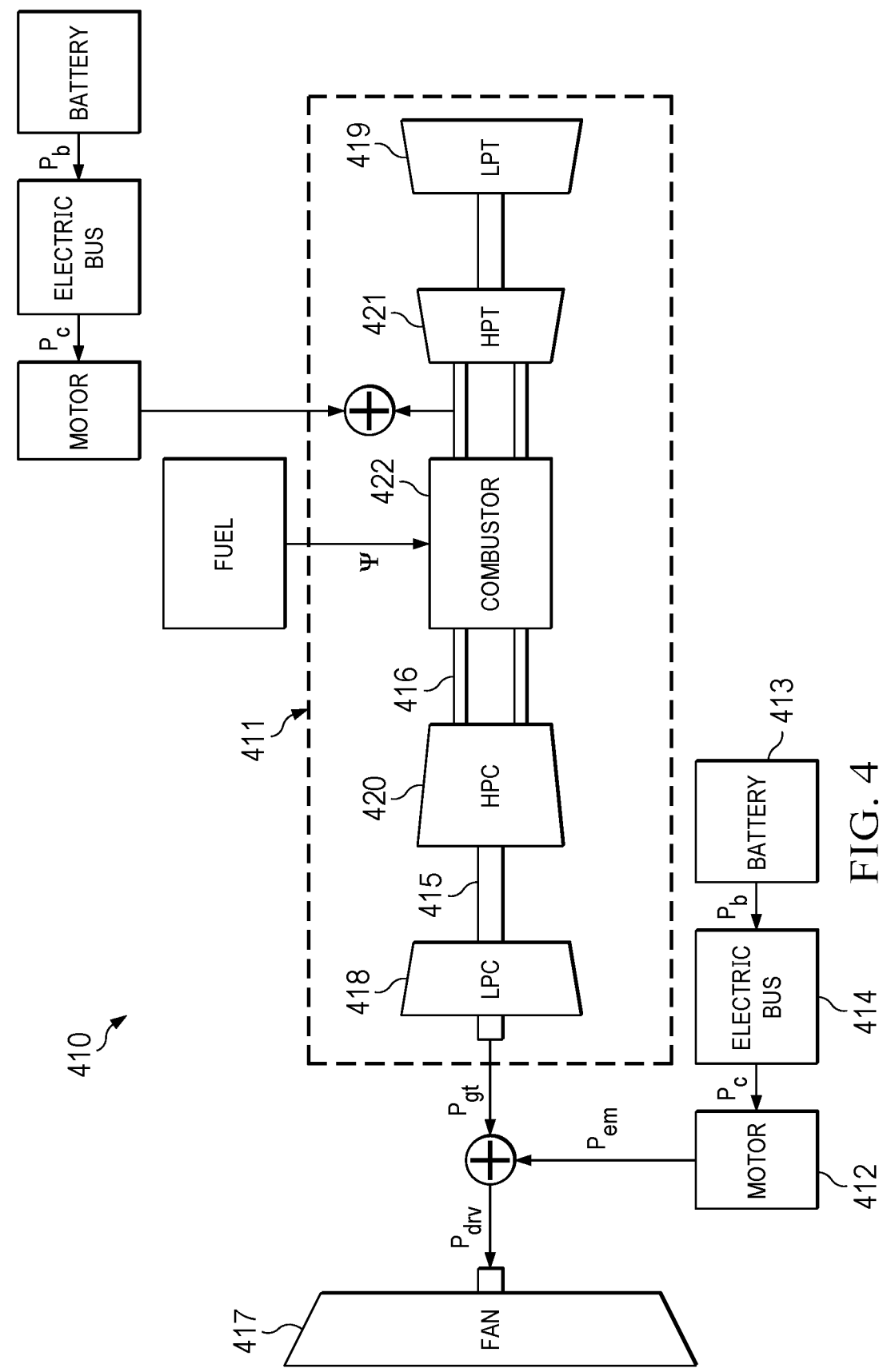
FIG. 4 is a schematic view of an example hybrid electric propulsion (HEP) system.

Referring now to FIG. 4, there is illustrated a schematic view of an example hybrid electric propulsion (HEP) system 410 for an aircraft that may be used for the electric motors 106, 108 connected to the low spool 112 and high spool 110 interconnected with an engine 114. The HEP system 410 includes a gas turbine 411, which provides gas turbine power $P_{gt}$ that is combustion-based, and one or more electric motors 412 that provides electric power $P_{em}$. The gas turbine 411 and electric motor(s) 412 cooperate according to a power splitting profile to provide a combined power $P_{drv}$. The power split between the gas turbine 411 and electric motor(s) 412 may rely 100% on the combustion-based power $P_{gt}$, 100% on the electric power $P_{em}$, or on some combination of the two.

The HEP system 410 includes one or more batteries 413 (e.g., lithium-ion batteries, etc.) that provide battery chemical power $P_b$. An electric bus 414 receives the power $P_b$ and outputs electric power $P_c$ to the electric motor(s) 412. As discussed above, the electric motor(s) 412 provide electric power $P_{em}$ in the HEP system 410.

The gas turbine 411 includes a low-speed spool 415 and a high-speed spool 16 mounted for rotation about an engine central longitudinal axis. The low-speed spool 415 generally interconnects a fan 417, a first (or low) pressure compressor 418, and a first (or low) pressure turbine 419. The high-speed spool 416 interconnects a second (or high) pressure compressor 420 and a second (or high) pressure turbine 421. A combustor 422 is arranged between the high-pressure compressor 420 and the high-pressure turbine 421. A core airflow is compressed by the low-pressure compressor 418 then the high-pressure compressor 420, is mixed and burned with fuel 423 in the combustor 422 and is then expanded over the high pressure turbine 421 and low pressure turbine 419. In FIG. 4, q represents a fuel consumption rate.

The electric motor(s) 412 may be configured to provide propulsion by driving rotation of the spools 415 and/or 416. In one nonlimiting example, a first electric motor 412 drives rotation of the low-speed spool 415, and a second electric motor 412 drives rotation of the high-speed spool 416.

It is understood that the parallel hybrid electric architecture depicted in FIG. 4 is a non-limiting example, and that other architectures could be used, such as a series-hybrid propulsion architecture. Also, although only one HEP system 410 is shown in FIG. 4, it is understood that multiple HEP systems 410 may be included on a given aircraft (e.g., two or four, depending on how many sources of propulsion are desired on the aircraft).

Figure 5:
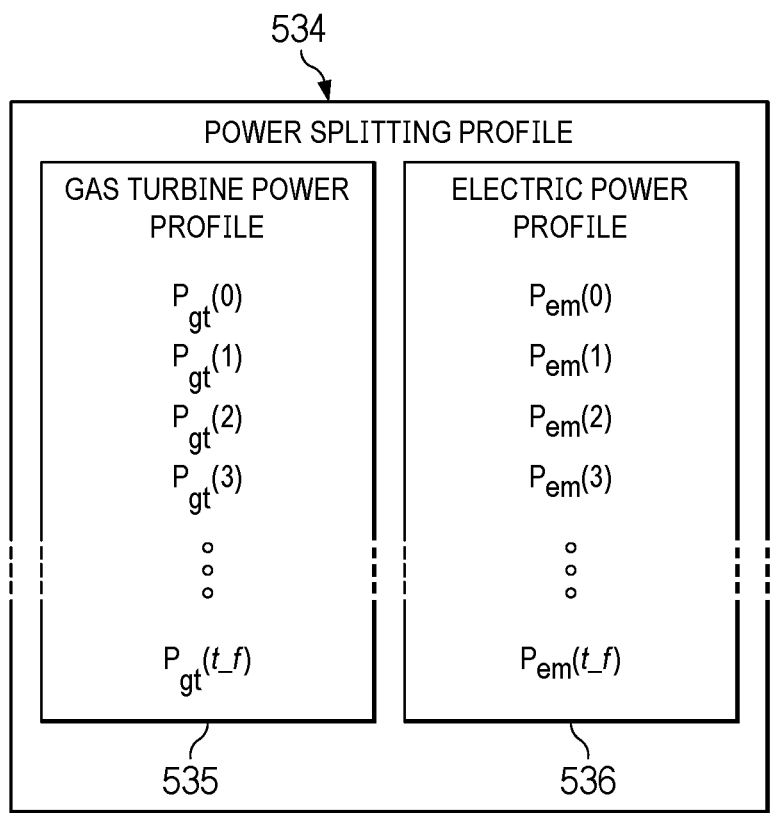
FIG. 5 is a schematic view of a power splitting profile that includes a gas turbine power profile and an electric power profile.

FIG. 5 is a schematic view of a power splitting profile 534 that includes a gas turbine power profile 535 and an electric power profile 536 to be used to achieve a particular fuel consumption objective with respect to operation of the auto-throttle 102. Together, the profiles 535 and 536 describe a plurality of power splits between the gas turbine 411 and electric motor(s) 412 of the HEP system 410. A first power split based on velocity factors 0 includes the values of $P_{gt}(0)$ and $P_{em}(0)$. A second power split based on velocity factors 1 includes the values of $P_{gt}(1)$ and $P_{em}(1)$, and so on.

Below, linear model predictive control (MPC) and non-linear MPC approaches are discussed to determine a power splitting profile 534.

In the first example below, a linear MPC is formulated as a convex optimization program in which aircraft dynamics are simplified and consider a small angle of attack (a) and a negligible component of the thrust along the direction of the lift force. This assumption allows an analytical calculation of the drive power as a function of the fuel mass, which is used to formulate the convex program. An MPC that solves this convex program may be referred to as a "linear MPC controller."

In one example implementation for the linear MPC controller, the following optimization problem is solved at every time step in real time to determine the power draw from the gas turbine and electric motor:

$$\min_{m_f, \phi, E_b, P_b, v} \sum_{k=t}^{N(t)-1} \qquad \text{eq. 1}$$

$$\left( \phi(k)\delta + (v(k) - v_{ref}(k))^2 \, w_v + a_1 \Delta P_{gt} + a_2 \Delta P_{em} \right)$$

$$\text{subject. to.} \quad m_f(k+1) = m_f(k) - \phi(k)\delta \qquad \text{eq. 2}$$

$$E_b(k+1) = E_b(k) - P_b(k)\delta \qquad \text{eq. 3}$$

$$\beta_0 + \beta_1(P_{drv}(m_a) - P_{em}(P_b)) \le \phi(k) \qquad \text{eq. 4}$$

$$\underline{\phi} \le \phi(k) \le \overline{\phi} \qquad \text{eq. 5}$$

$$\underline{P_b} \le P_b(k) \le \overline{P_b} \qquad \text{eq. 6}$$

$$\underline{E_b} \le E_b(k) \le \overline{E_b} \qquad \text{eq. 7}$$

$$\underline{v} \le v(k) \le \overline{v} \qquad \text{eq. 8}$$

In the equations above, $\delta$ is the measurement sample time. The first term in the cost function is simply the fuel burn, while the second term is a quadratic term (always greater than or equal to zero) that penalizes the deviation from the reference velocity. The last two terms allow for penalization of the rate of change of the gas turbine and electric motor contributions to the power split, with $\Delta P_{gt} = P_{gt}(k) - P_{gt}(k-1)$ and $\Delta P_{em} = P_{em}(k) - P_{em}(k-1)$. The relative ratio of the weights can be used to penalize heavily changes in the gas turbine contribution and weigh more favorably the use of the electric motor when $a_1 < a_2$. The velocity has to be maintained within allowable bounds at each point in time (Eq. 8). The weight $w_v$ provides a parameter for setting the relative importance of minimization of total fuel burn and the reduction in reference velocity error. We also note that an alternative form of the cost function can be $$\min_{m_f, \phi, E_b, P_b, v} \sum_{k=t}^{N(t)-1} \qquad \text{Eq. 9}$$

$$\left( \phi(k)\delta + \sum_{\omega_{min}}^{\omega_{max}} V(\omega, k) w(\omega, k) + a_1 \Delta P_{gt} + a_2 \Delta P_{em} \right)$$

Where the terms in the sum are the components of velocity at a range of high frequencies [$\omega_{min}$, $\omega_{max}$]. This way one can tailor the range of frequencies in the high-frequency part of the velocity that will be targeted by the high-frequency motor power input computed by the neural network.

The decision variables for the aircraft velocity, desired velocity, wind speed, etc. are considered for each propulsion system. In the example below, it is assumed that there are a total of $n_{prop}$ propulsion systems, and the dynamics of the fuel consumption and battery state-of-charge are identical across the propulsion systems. The drive power $P_{drv}(.)$ is obtained analytically as a quadratic function of the aircraft mass, which may be computed as shown below.

$$m_a = m_{anf} + m_f n_{prop} \qquad \text{eq. 10}$$

In equation 10, $m_{anf}$ is the aircraft mass when the aircraft's fuel tanks are empty. Constraints on the battery state of charge and gas turbine and electric motor powers are also considered in the MPC optimization problem. The latter two types of constraints are appropriately converted to the fuel consumption and battery chemical power constraints for the optimization problem.

The linear MPC problem is solved after each measurement sampling period (e.g., on the order of minutes, seconds, or milliseconds), by considering the predictions of the altitude, velocity, and fuel consumptions in the remainder of the flight. The first element of the optimal solutions ($\phi^0(0)$, $P_b^0(0)$) of the linear MPC problem is used to determine the power draw from the gas turbine 411 and electric motor 412. The variable $\phi^0(0)$ is converted using the inverse of the function $\phi(P_{gt})$ (discussed in equation 7) to obtain the gas turbine power $P^0_{gt}(0)$. The electric motor power $P^0_{em}(0)$ is obtained using the function $P_{em}(P_b)$ based on the solution $P_b^0(0)$.

The linear MPC formulation discussed above assumes a small angle of attack and that the contribution of the thrust along the direction of the lift force is zero. In practice, this assumption may not always be correct. In addition, due to the nature of battery chemical to electric motor power function $P_{em}(P_b)$, a convex optimization program is obtained for the MPC controller. This function may be difficult to use to obtain a convex program for the MPC.

Due to these reasons, use of a nonlinear MPC controller will in at least some instances provide a more accurate consideration of flight dynamics, and a more optimal solution to the power splitting problem. The nonlinear MPC controller relaxes the assumption that the contribution of the thrust along the direction of the lift force is zero and solves a nonlinear optimization problem. This MPC may be referred to as a nonlinear MPC (NMPC) controller. For both controllers (linear and nonlinear), one may convert the continuous time flight dynamics into discrete time at a given measurement sample time ($\delta$). The discrete time models are used in the optimization problem formulations of the MPC controllers.

The nonlinear MPC controller may be formulated using the equations below.

$$\min_{m_f, P_{gt}, E_b, P_{em}, T, \alpha, v} \sum_{k=t}^{N(t)-1} \phi(P_{gt}(k))\delta + g(v, k) + a_1 \Delta P_{gt} + a_2 \Delta P_{em} \qquad \text{eq. 11}$$

where $m_f$ represents remaining fuel mass, $P_{gt}$ represents power of the gas turbine 411, $E_b$ represents a state of charge of the one or more batteries 413, $P_{em}$ represents power of the electric motor 412, $T$ represents thrust provided by the combination of all propulsion systems of an aircraft, and $\alpha$ represents the angle of attack. The term $g(v,k)$, which penalizes the velocity error, can have the form of the second term in Eq. 1, or Eq 9. The same additional penalties to the rates of change of power to the gas turbine and the electric motor as for Eq. 1 and Eq. 9 are added here as well.

The minimization of the objective function in Eq. 11 for the nonlinear MPC controller is subject to the following constraints:

$$m_f(k+1) = m_f(k) - \phi(P_{gt}(k))\delta \qquad \text{eq. 12}$$

$$E_b(k+1) = E_b(k) - g(h(P_{em}(k)))\delta \qquad \text{eq. 13}$$

$$m_a \Delta v(k) + m_a g \sin(\gamma(k)) = T(k)\cos(\alpha(k)) - (1/2)C_D(\alpha(k))\rho S v(k)^2 \qquad \text{eq. 14}$$

$$m_a v(k)\Delta \gamma(k) + m_a g \cos(\gamma(k)) = T(k)\sin(\alpha(k)) + (1/2)C_L(\alpha(k))\rho S v(k)^2 \qquad \text{eq. 15}$$

$$m_a v(k)\Delta v(k) + (1/2)C_D(\alpha(k))\rho S v(k)^3 + m_a g v(k)\sin(\gamma(k)) \leq \qquad \text{eq. 16}$$

$$(P_{gt}(k) + P_{em}(k))n_{prop} \underline{P_{gt}} \leq P_{gt}(k) \leq \overline{P_{gt}}$$

$$\underline{P_{em}} \leq P_{em}(k) \leq \overline{P_{em}} \qquad \text{eq. 18}$$

$$\underline{E_b} \leq E_b(k) \leq \overline{E_b} \qquad \text{eq. 19}$$

$$\underline{v} \leq v(k) \leq \overline{v} \qquad \text{eq. 20}$$

Equation 9 represents fuel consumption for the remainder of a flight. Equations 12-13 represent fuel mass and battery state-of-charge dynamics. Equations 15-18 represent a power demand constraint for the HEP system 410.

Equations 16-19 represent constraints for gas turbine power, electric motor power, and battery state of charge, and equation 20 represents constraints for the aircraft velocity.

The first elements of the optimization solution $P^0_{gt}(0)$ and $P^0_{em}(0)$ determine the power splitting by the NMPC controller to be implemented at the current time step according to the current operation of the auto-throttle 102. The nonlinear MPC formulation has the potential of providing a higher fuel savings than the linear MPC since it considers accurate flight dynamic models. Additionally, more complex models for the flight equations of motion, fuel consumption, and battery state of charge can be naturally incorporated in a nonlinear MPC formulation, without the need of detailed simplifications of the flight dynamics to convexify the MPC optimization problem.

Utilizing either of the MPC controllers described above (linear or nonlinear) during flight to determine power splitting section require solutions of optimization problems in real time. As a result, these controllers are also should be deployable on computing hardware with enough memory and computing resources to perform the optimization calculations with sufficient efficiency. An alternative to the real time optimization approach is to approximate the solution of the problem offline using a neural network. Then, use the neural network online in real time in place of an optimization solver for the MPC deployment. The advantage of this approach is that a neural network can be executed orders of magnitude faster than an optimization solver (e.g., in the case of a feedforward neural network, since only a feedforward evaluation of the neural network is required in real time). The neural network can also be deployed on memory constrained hardware. This approach can be highly useful to replace the nonlinear program for the NMPC controller since it requires solutions to a challenging optimization problem. Next, the design process of neural networks to replace the MPC online optimization for HEP systems is described.

Training data for the neural network is generated by repeatedly solving the MPC problem for a range of auto-throttle input parameters. Then, closed-loop MPC simulations are performed, and the optimal solutions and input parameters to the neural network are gathered as training data. The sampled mission profiles and the closed-loop MPC simulations include representative real time changes during missions, to also expose the neural network to such changes. After the data collection procedure, the following supervised learning is problem to determine the parameters ONN in the neural network.

$$\min_{\theta_{NN}} \sum_{i=0}^{N_s} \left\| \begin{bmatrix} P_{gti}^0 \\ P_{emi}^0 \end{bmatrix} - f_N(t_i, m_{fi}, E_{bi}, m_{anf}, h_{t:t\_f,i}, v_{t:t\_f,i}; \theta_{NN}) \right\|^2 \quad \text{eq. 21}$$

In one example of the supervised learning process, a portion of the potential overall training data is kept as a holdout data set for validation (as described below). The optimization problem loss is also monitored on this holdout data at the end of every epoch. After the training process, the neural network weights that provide, e.g., the best loss on the holdout set for the final validation, are used. This approach ensures that the neural network weights are not overfitted to the training data. All the input and output samples may be scaled using the mean and standard deviation of each variable to facilitate the scaling of the above supervised learning problem. After the training and validation processes, the neural network can be used as a surrogate of the MPC controller for the final deployment.

Figure 6:
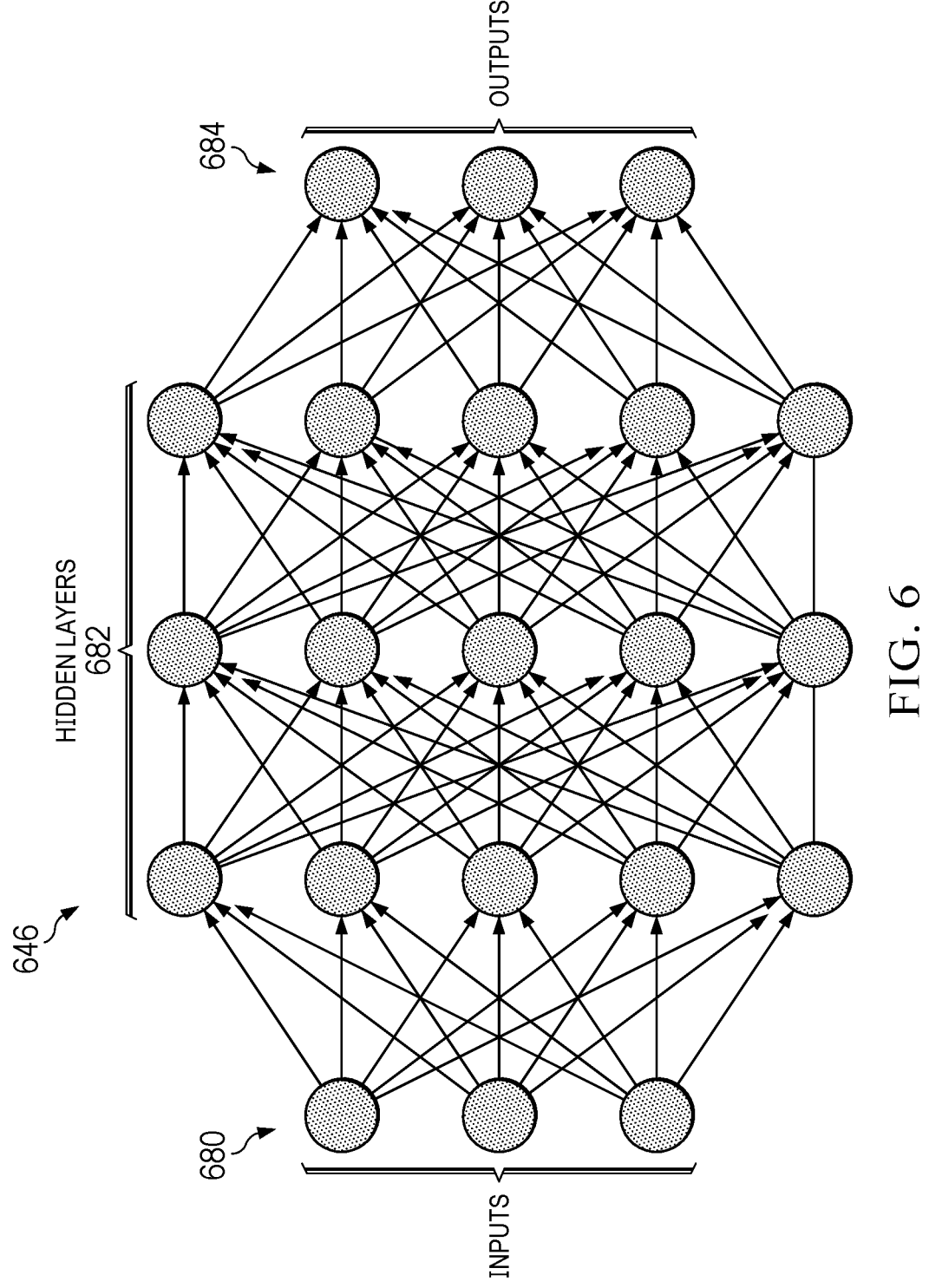
FIG. 6 is a schematic view of an example neural network.

FIG. 6 is a schematic view of an example neural network 646. As shown, the neural network includes an input layer 680, an output layer 684, and a plurality of hidden layers 682 therebetween.

Figure 7:
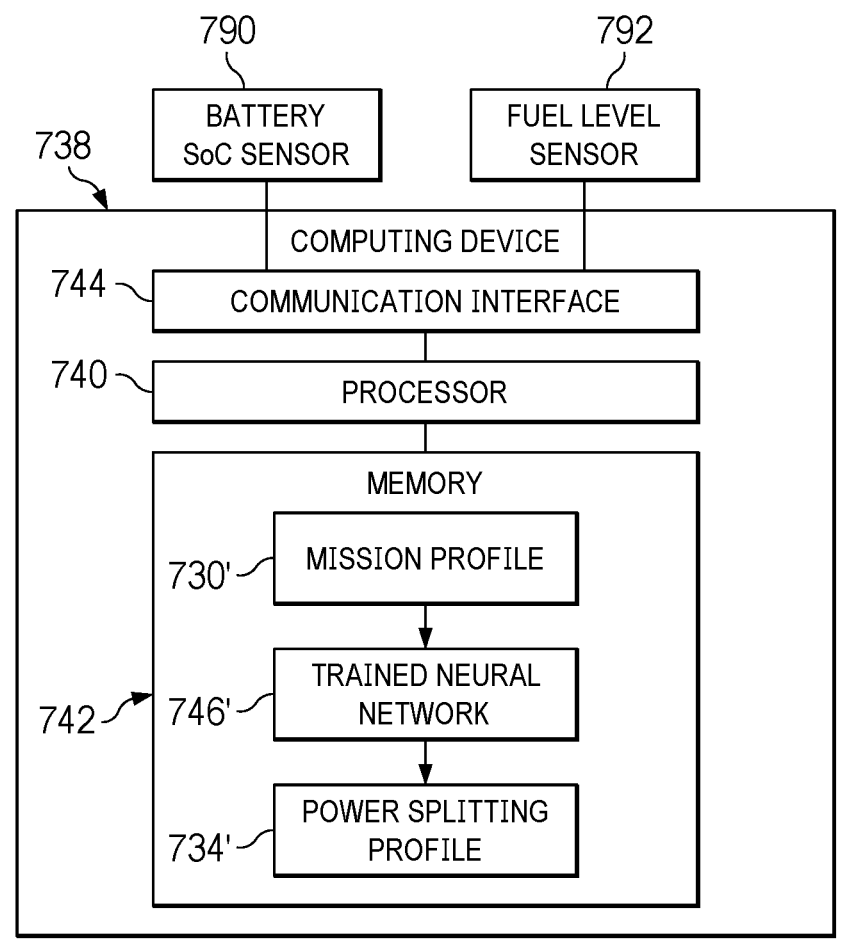
FIG. 7 is a schematic view of a second computing device that utilizes a neural network to obtain a power splitting profile.

FIG. 7 is a schematic view of a computing device 738 that is configured to utilize the trained neural network 646 during an actual flight, as represented by mission profile 730. The processor 740 utilizes the trained neural network 746 to obtain a power splitting profile 734 for the mission profile 730. The computing device 726 may utilize communication interface 744 to obtain a battery state of charge level from a battery state of charge sensor 790 and/or obtain a fuel level from a fuel level sensor 792, for example.

FIG. 8 is a schematic view of how the computing device 738 may use the trained neural network 846 to generate the power splitting profile 734' for the mission profile 30'.

As shown, the trained neural network 846 receives a plurality of inputs 870 (described above in connection with equation 18), and outputs a power splitting profile 834 corresponding to the mission profile 730 and seeks to achieve an auto-throttle objective of the mission profile 730.

The trained neural network 646 is well-suited for use in real-time instead of implementing an MPC 648 (e.g., non-linear MPC) on an aircraft, as the calculations associated with determining power splitting profiles 834 from the neural network 646 are less complex, and correspondingly require less computing power than utilizing the MPC 648 in real-time. In one example, utilizing the neural network 646 was found to be approximately 1,600 times faster on average than using a nonlinear MPC controller to determine power splitting profiles 834. Due to this computational efficiency, and the potentially small size of the trained neural network 646, the neural network 646 may be suitable for deployment on memory constrained hardware that would otherwise not be well-suited for simply using the MPC in real-time on a flight to generate power splitting profiles. Moreover, in testing, use of the neural network 646 was also found to have a fuel savings equal to that of the power splitting profiles 834 from a nonlinear MPC. Moreover, a mission profile 730 may change in real time (e.g., due to changes in weather, or a request from the air traffic controller), and the neural network 646 is well-suited for adapting to such real time changes, because the training data is generated by the MPC accounting for the possible real time changes in mission profiles.

Figure 9:
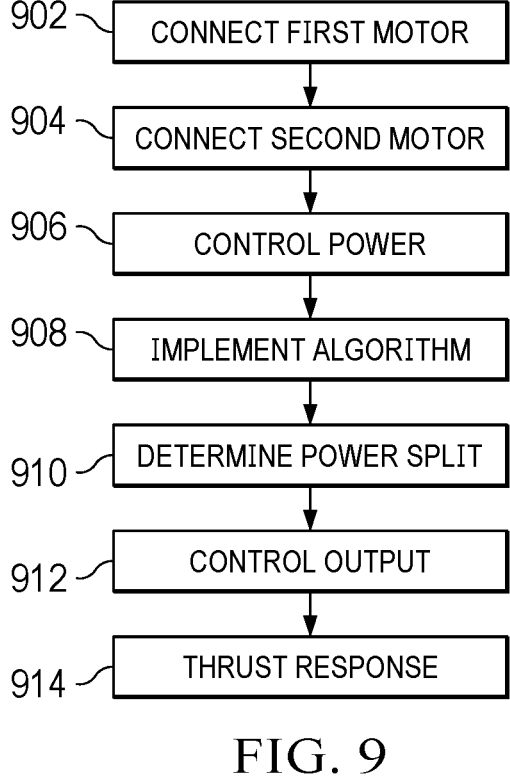
FIG. 9 is a flow diagram of the method for controlling the operation of the auto-throttle using the hybrid electric engines.

Referring now to FIG. 9, there is illustrated a flow diagram of the method for controlling the operation of the auto-throttle using the hybrid electric engines discussed herein above. A first hybrid electric motor is connected at step 902 to the low spool of an engine. A second hybrid electric motor is connected at step 904 to the high spool of the engine. An amount of power provided to the engine is controlled at step 906 responsive to at least one aircraft parameter using an auto-throttle. A power splitting algorithm is implemented at step 908 between the auto-throttle and at least one of the first and second hybrid electric motors. Using the power splitting algorithm, a power split is determined at step 910 to divide fuel provided to the engine and power provided to the at least one of the first and second hybrid electric motors responsive to control signals from the auto-throttle to provide an optimal split between fuel flow to the engine and power to the at least one of the first and the second electric motors. A control signal is output by the algorithm at step 912 responsive to the determined power split. A fast low amplitude transient thrust response from the auto-throttle is provided at step 914 to the at least one of the first and the second hybrid electric motors.

It may be advantageous to set forth definitions of certain words and phrases used throughout this patent document. The term "couple" and its derivatives refer to any direct or indirect communication between two or more components, whether or not those components are in physical contact with one another. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present disclosure should not be read as implying that any particular element, step, or function is an essential or critical element that must be included in the claim scope. The scope of patented subject matter is defined only by the allowed claims. Moreover, none of the claims invokes 35 U.S.C. § 112 (f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112 (f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A system comprising:
an engine having a low spool and a high spool;
a first hybrid electric motor connected to the low spool;
a second hybrid electric motor connected to the high spool;
an auto-throttle controller configured to provide a thrust control signal;
an automatic engine controller configured to determine an amount of power provided to the engine responsive to at least one aircraft parameter and the thrust control signal from the auto-throttle controller; and
a power splitting algorithm implemented in the automatic engine controller configured to determine a power split responsive to the thrust control signal from the auto-throttle controller that controls an amount of fuel flow provided to the engine and power provided to at least one of the first and second hybrid electric motors to provide a thrust responsive to control signals from the automatic engine controller.

2. The system of claim 1 further comprising a neural network for implementing the power splitting algorithm, wherein the power split is determined using the neural network responsive to a throttle thrust level angle and a measured velocity of an aircraft.

3. The system of claim 2 further comprising an aircraft autopilot velocity controller having an integrated auto-throttle for determining the throttle thrust level angle responsive to the measured velocity of the aircraft and a predetermined desired velocity.

4. The system of claim 3, wherein the power splitting algorithm provides improved changes in thrust response required by the auto-throttle while maintaining a substantially constant fuel flow to the engine.

5. The system of claim 1 further comprising a neural network for implementing the power splitting algorithm, wherein the power split is determined responsive to a velocity reference from aircraft flight controller and a measured velocity of an aircraft.

6. The system of claim 5, wherein the power splitting algorithm provides rapid thrust changes to produce smooth airplane velocity while maintaining a substantially constant fuel flow to the engine.

7. The system of claim 1, wherein the at least one of the first and the second hybrid electric motors provide a fast low amplitude transient thrust response from the automatic engine controller.

8. The system of claim 1, wherein the power splitting algorithm provides an optimal split between fuel flow to the engine and power to the at least one of the first and the second electric motors.

9. A system comprising:
an engine having a low spool and a high spool;
a first hybrid electric motor connected to the low spool;
a second hybrid electric motor connected to the high spool;
an auto-throttle controller configured to provide a thrust control signal;
an automatic engine controller configured to determine an amount of power provided to the engine responsive to at least one aircraft parameter and the thrust control signal from the auto-throttle controller;
a power splitting algorithm implemented in the automatic engine controller configured to determine a power split responsive to the thrust control signal from the auto-throttle controller that controls an amount of fuel flow provided to the engine and power provided to the at least one of the first and second hybrid electric motors responsive to control signals from the automatic engine controller, wherein the power splitting algorithm is configured to command the at least one of the first and the second electric motors to respond to higher frequency changes in the thrust control signal from the auto-throttle controller; and
wherein the at least one of the first and the second hybrid electric motors provide a fast low amplitude transient thrust response to the automatic engine controller.

10. The system of claim 9 further comprising a neural network for implementing the power splitting algorithm, wherein the power split is determined using the neural network responsive to a throttle thrust level angle and a measured velocity of an aircraft.

11. The system of claim 10 further comprising an aircraft autopilot velocity controller having an integrated auto-throttle for determining the throttle thrust level angle responsive to the measured velocity of the aircraft and a predetermined desired velocity.

12. The system of claim 11, wherein the power splitting algorithm provides improved changes in thrust response required by the auto-throttle while maintaining a substantially constant fuel flow to the engine.

13. The system of claim 9 further comprising a neural network for implementing the power splitting algorithm, wherein the power split is determined responsive to responsive to a velocity reference from aircraft flight controller and a measured velocity of an aircraft.

14. The system of claim 13, wherein the power splitting algorithm provides rapid thrust changes to produce smooth airplane velocity while maintaining a substantially constant fuel flow to the engine.

15. A method comprising:
connecting a first hybrid electric motor to a low spool of a engine;
connecting a second hybrid electric motor to a high spool of the engine;
receiving a thrust control signal from an auto-throttle controller;
controlling an amount of power demanded from the engine using an automatic engine controller responsive to the thrust control signal from the auto-throttle controller;
implementing a power splitting algorithm in the automatic engine controller to control at least one of the first and second hybrid electric motors and the engine;
determining, using the power splitting algorithm, a power split responsive to the thrust control signal from the auto-throttle controller that controls an amount of fuel flow provided to the engine and power provided to the at least one of the first and second hybrid electric motors to provide a thrust responsive to control signals from the automatic engine controller;
outputting a control output responsive to the determined power split to the engine, the first hybrid electric motor and the second hybrid electric motor; and
providing a fast low amplitude transient thrust response from the automatic engine controller to the at least one of the first and the second hybrid electric motors.

16. The method of claim 15 further comprising:

a neural network for implementing the power splitting algorithm; and determining the power split using the neural network responsive to a throttle thrust level angle and a measured velocity of an aircraft.

17. The method of claim 16 further comprising determining the throttle thrust level angle responsive to the measured velocity of the aircraft and a predetermined desired velocity using an aircraft autopilot velocity controller having an integrated auto throttle.

18. The method of claim 15 further comprising:

implementing the power splitting algorithm using a neural network; and determining the power split responsive to a velocity reference from aircraft flight controller and a measured velocity of an aircraft.

19. The method of claim 15, wherein the step of determining further comprises:

improving changes in thrust response required by the auto-throttle; and maintaining a substantially constant fuel flow to the engine.

20. The method of claim 15, wherein the step of implementing the power splitting algorithm further implements the power splitting algorithm using at least one of model predictive control and AI based methods.

* * * * *